(12) United States Patent
Shimizu et al.

(10) Patent No.: US 6,314,354 B1
(45) Date of Patent: Nov. 6, 2001

(54) LANE FOLLOWING SYSTEM FOR A VEHICLE

(75) Inventors: Youji Shimizu, Yokohama; Tatsuo Kuwabara, Kanagawa, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/566,949

(22) Filed: May 8, 2000

(30) Foreign Application Priority Data

May 12, 1999 (JP) .................................................. 11-131615

(51) Int. Cl.[7] ................................. G06F 7/00; G06F 17/00
(52) U.S. Cl. ................................ 701/41; 701/9; 701/116; 180/168; 180/204; 340/438
(58) Field of Search ............................... 701/1, 9, 23, 24, 701/41, 301, 116, 117; 180/168, 204; 340/436, 437, 438, 903

(56) References Cited

U.S. PATENT DOCUMENTS 3,633,701 * 1/1972 LeTourneau et al. ............... 180/204
6,009,377 * 12/1999 Hiwatashi ............................ 701/301
6,020,673 *  2/2000 Matsumoto ...................... 310/316.02

* cited by examiner

Primary Examiner—William A. Cuchlinski, Jr.
Assistant Examiner—Gertrude Arthur
(74) Attorney, Agent, or Firm—Foley & Lardner

(57) ABSTRACT

An automatic lane following system for a vehicle is adapted to control the direction of a moving vehicle along a predetermined path. An associated controller estimates the vehicle's lateral position in relation to the lane markings (usually the white painted lines). An optical sub-system or a video camera or equivalent sensor is mounted on a vehicle and used to detect the lane markings. An actuator coupled to the steering mechanism is used to control the steering position of the front road wheels in response to a steering signal from a controller. An interruption switch is closed to enable the steering system actuator. An interruption switch actuator is displaceable between a rest or stored position in which the interruption switch is open and an operable position in which the interruption switch is closed.

12 Claims, 19 Drawing Sheets

LANE FOLLOWING SYSTEM FOR A VEHICLE

FIELD OF THE INVENTION

The present invention relates to an automatic lane following system for a vehicle. The automatic lane following system is adapted to control the direction of a moving vehicle along a predetermined path.

BACKGROUND OF THE INVENTION

Automatic lane following systems have been demonstrated operating at motor way speeds. Such systems certainly prevent lane departure while lane markings (usually the white painted lines) are present. A controller of the systems estimates the vehicle's lateral position in relation to the lane markings. An optical sub-system or a video camera or equivalent sensor is mounted on a vehicle and used to detect the lane markings. An actuator coupled to the steering mechanism is used to control the steering position of the front road wheels. The lane following system is enabled when a system main switch is closed. When a direction indicator of the vehicle is actuated, the lane following system is disabled.

SUMMARY OF THE INVENTION

Preferably, the lane following system includes an interruption switch as mounted on the steering instrumentality within the reach of the driver's finger(s) so that the driver can keep on activating the interruption switch to enable the lane following system. The driver may deactivate the interruption switch by keeping the finger(s) off to take over control of the steering mechanism. The provision of the interruption switch on the steering instrumentality makes it possible for the driver to activate or deactivate the main system switch with the hands gripping the rim of the steering instrumentality, ensuring a smooth shift from the automatic lane following steering operation to the manual steering operation.

In order to avoid unintended activation of the interruption switch, the location of an actuator for the interruption switch must be determined. If the interruption switch actuator is disposed within a site sufficiently remote from the rim of the steering instrumentality, a driver work load increases when the driver keeps on activating the interruption switch.

Accordingly, a need remains to avoid human unintended activation of the interruption switch and to reduce a driver work load when the driver keeps on activating the interruption switch.

According to one aspect of the present invention, there is provided a lane following system for a vehicle, comprising:

a steering instrumentality;
a steering system including a steering mechanism for controlling the steering position of front road wheels of the vehicle in response to manual operation of said steering instrumentality,
said steering system including an actuator for controlling the steering position of the front road wheels in response to a steering signal;
a controller operative to generate the steering signal;
an interruption switch operatively coupled to said controller to deactivate said actuator when said interruption switch has a first position thereof and to activate said actuator when said interruption switch has a second position; and
an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption actuator being displaceable between said rest position and said operational position.

According to another aspect of the present invention, there is provided a lane following system for a vehicle, comprising:

a steering instrumentality;
a steering system including a steering mechanism for controlling the steering position of front road wheels of the vehicle in response to manual operation of said steering instrumentality,
said steering system including an actuator for controlling the steering position of the front road wheels in response to a steering signal;
a controller to generate the steering signal; and
a human interface operatively coupled to said controller, said human interface including a handle mounted on said steering instrumentality and means for deactivating said actuator when said handle is in a rest position and activating said actuator when said handle is held in an operable position by manual operation.

According to still another aspect of the present invention, there is provided a method of facilitating steering of a vehicle having front road wheels by tracking a contrived center line of a road, the vehicle having a steering system including an actuator and a steering instrumentality, and the contrived center line being a center line between lane markings defining a lane boundary on the road, comprising:

encouraging the driver to keep on manually holding an interruption switch actuator in an operational position to close an interruption switch while gripping the steering instrumentality, thereby to cause the actuator of the steering system to control the steering position of the front road wheels in response to a steering signal from a controller; and
manually initiating displacement of the interruption switch actuator from the operable position to a rest position to open the interruption switch, thereby to cause the steering system to control the steering position of the front road wheels in response manual operation of the steering instrumentality.

DESCRIPTION OF THE PREFERRED EMBODIMENTS

Figure 1:
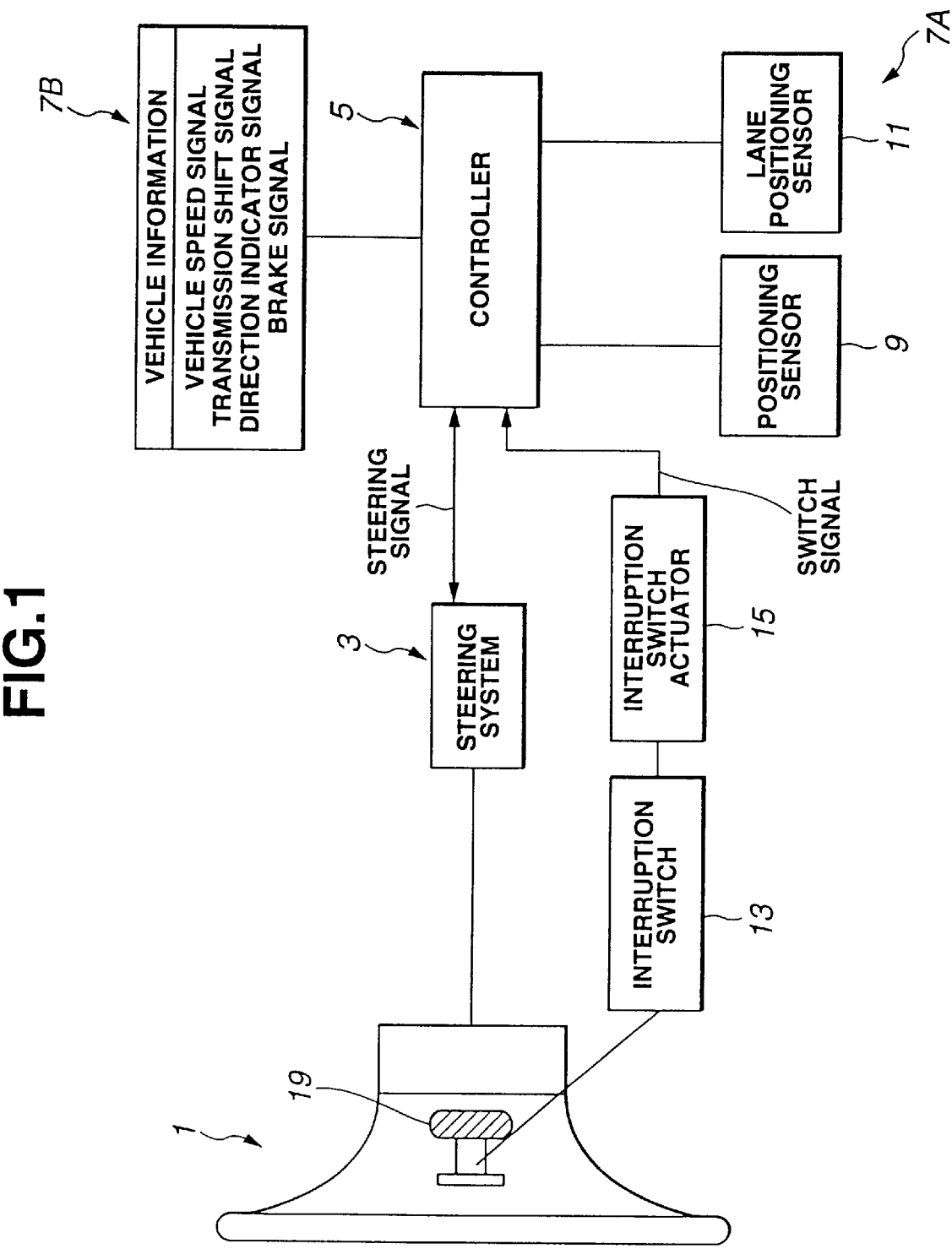
FIG. 1 is a block diagram of a first preferred implementation of the present invention.

Referring to the accompanying drawings, for brevity of description, the same or like reference numerals and characters are used to denote similar or like parts or portions throughout all Figures.

(First Preferred Implementation)

Referring to FIG. 1, the reference numeral 1 denotes a steering instrumentality, in the form of a steering wheel manipulated by a driver. The steering instrumentality 1 is coupled to a steering system 3. The steering system 3 comprises a steering mechanism, not shown, for controlling the steering position of the front road wheels of a vehicle in response to manual operation of the steering instrumentality 1. The steering system 3 includes an actuator. The actuator controls the steering position of the front road wheels in response to a steering signal generated by a controller 5. The actuator may comprise a sub-system to control supply of oil to and discharge thereof from a power cylinder of a power assisted steering system.

The controller 5 is a microprocessor based control system that includes as usual a central processor unit (CPU), a read only memory (ROM), a random access memory (RAM), and an input/output unit (I/O). The ROM stores programs of a lane following control routine. Generally denoted by the reference numeral 7A is a group of sensors, which include a vehicle positioning sensor 9 to detect the position of a vehicle and a lane positioning sensor 11 to detect the presence of lane markings on a road. Generally denoted by the reference numeral 7B is a list of vehicle information that includes a vehicle speed signal, a direction indicator signal, a transmission shift signal, and a brake signal. Information detected by the group of sensors 7A and the vehicle information processor 7B is fed to the controller 5.

The steering instrumentality 1 is provided with an interruption switch 13. When the switch 13 is activated to a closed position, the lane following system is enabled so that the controller 5 activates the actuator of the steering system 3. When the switch 13 is deactivated to an open position, the lane following system is disabled so that the controller 5 deactivates the actuator of the steering system. An actuator 15 for the switch 13 is provided. Referring to FIGS. 3, 4, 5A, and 5B, the interruption switch actuator 15 has a rest position as illustrated in FIG. 5A, i.e., a stored position into the steering instrumentality 1, and an operational position as illustrated in FIG. 5B. The switch actuator 15 is displaceable between the stored position and the operational position. In the stored position, the actuator 15 deactivates the interruption switch 13 to keep it open. In the operational position, the actuator 15 activates the interruption switch 13 to keep it open in response to manual operation of the actuator 15. A switch signal indicative of the open or closed position of the switch 13 is fed to the controller 5.

Figure 2:
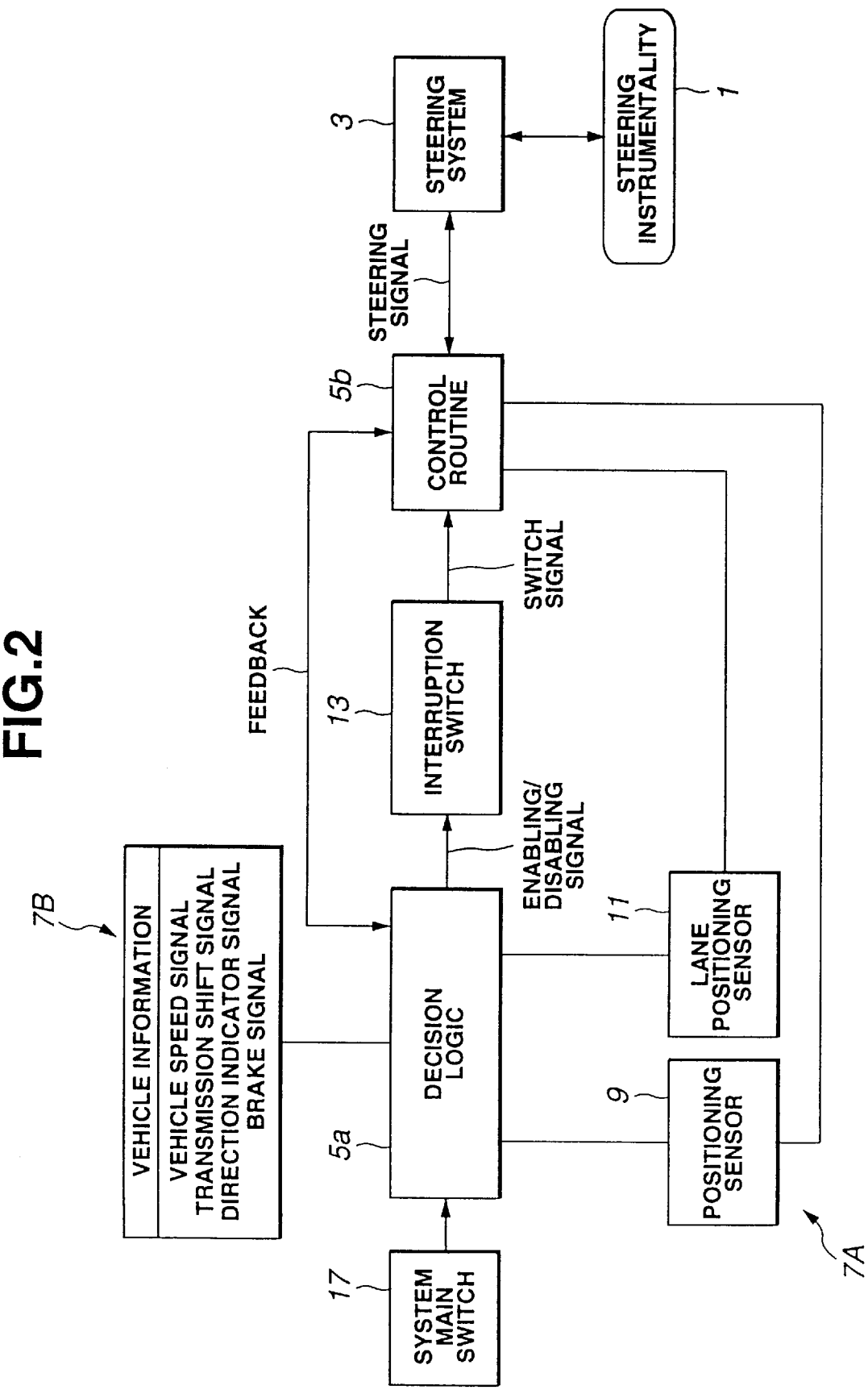
FIG. 2 is a system block diagram of a lane following system.

FIG. 2 illustrates a lane following system having a system main switch 17. A controller 5 may be divided into a decision logic 5a for determining whether or not the current condition allows the lane following operation, and a control routine 5b for controlling the lane following operation. A switch signal from the system main switch 17 is fed to the decision logic 5a. An interruption switch 13 is operatively disposed between the decision logic 5a and the control routine 5b.

In operation, the actuator of the steering system 3 is disabled when the system main switch 17 is deactivated or turned OFF or the interruption switch 13 is deactivated or turned OFF. Under this condition, the steering system 3 can control the steering position of the front road wheels in response to manual operation of a steering instrumentality 1. When the system main switch 17 is activated or turned ON, the decision logic 5a keeps on checking information carried by the sensor signals from the positioning sensor 9 and lane positioning sensor 11, vehicle speed signal, direction indicator signal, shift signal, and brake signal to determine whether or not the current condition allows the lane following operation.

In the case where it is determined that the current condition allows the lane following operation, when the interruption switch 13 is activated or turned ON by manual operation of the vehicle driver, the control routine 5b runs to generate the control signal applied to the actuator of the steering system 3. Accordingly, the vehicle is steered by the actuator of the steering system 3 to follow the recognized lane markings.

It is the understanding of the inventors that a driver should keep on gripping a steering instrumentality 1 while the actuator of the steering system 3 controls steering position of the front road wheels when the lane following system is enabled. This is because the driver can smoothly cope with the manual steering operation immediately after interruption of the lane following operation. It is also preferred, according to the understanding of the inventors, that the interruption switch 13 should not be activated unintentionally while the driver conducts manual operation of the steering instrumentality 1 to control steering position of the front road wheels.

According to the first preferred implementation, an actuator 15 for an interruption switch 13 is provided. The interruption switch actuator 15 has a stored position recessed in relation to a steering instrumentality 1 and an operational position. Referring to FIGS. 3 to 5B, description on the first preferred implementation is made.

The interruption switch actuator 15 is mounted on the steering instrumentality 1. FIG. 5A illustrates the stored position of the actuator 15. FIG. 5B illustrates the operational position of the actuator 15. The actuator 15 includes a handle 19 that is displaceable between its stored position as illustrated in FIG. 5A and its operational position as illustrated in FIG. 5B.

Figure 4:
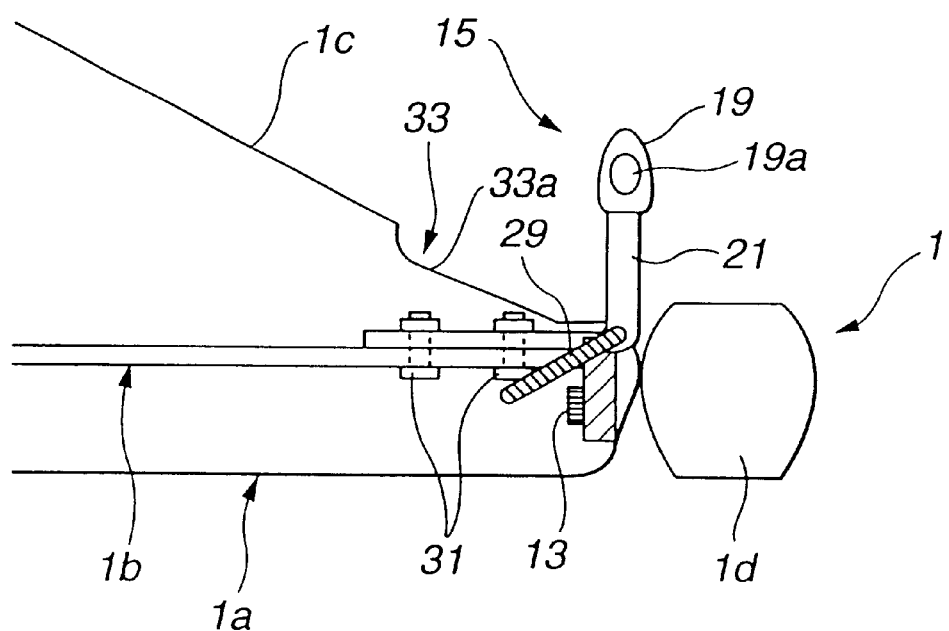
FIG. 4 illustrates the actuator as mounted on a steering instrumentality.
Figure 5A:
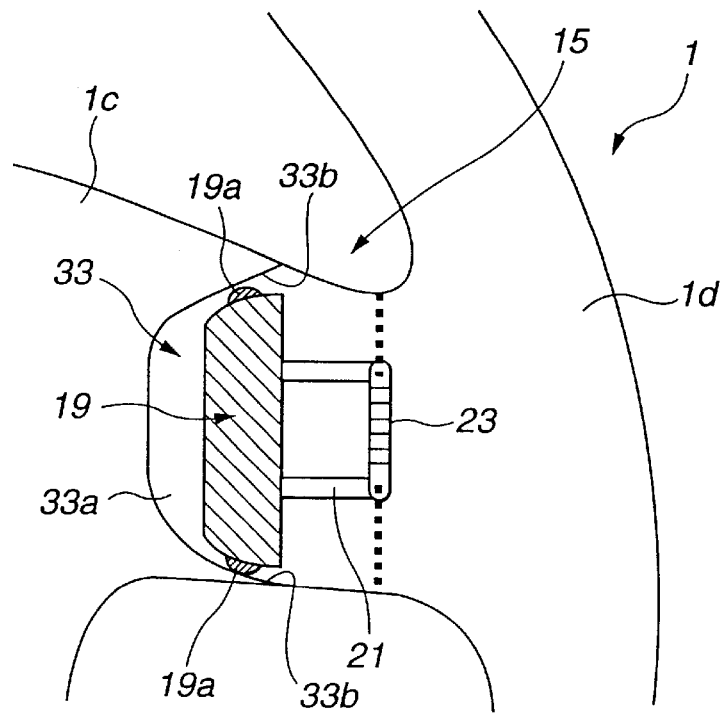
FIG. 5A illustrates the actuator in its stored position to deactivate the interruption switch.
Figure 5B:
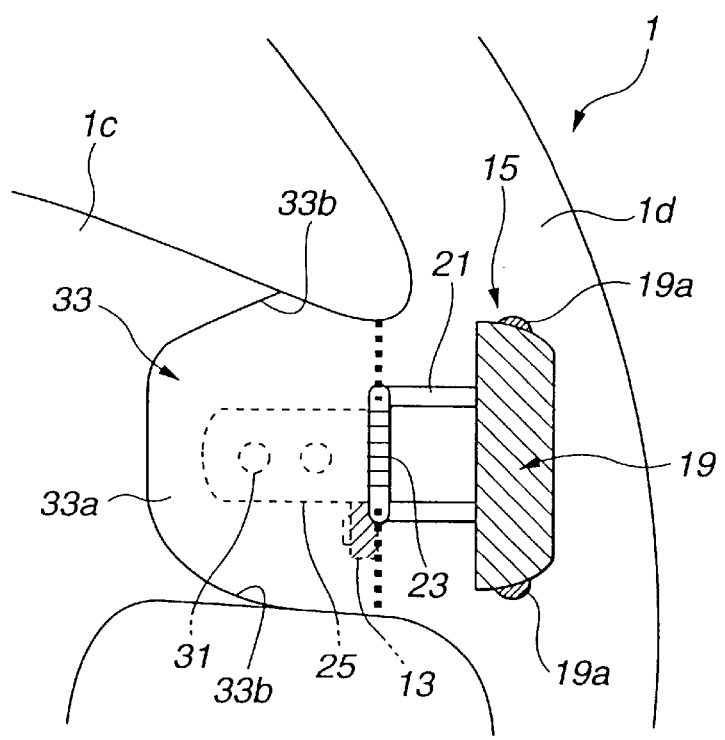
FIG. 5B illustrates the actuator in its operational position to activate the interruption switch.

As will be readily seen from FIG. 4, the actuator 15 is mounted on the steering instrumentality 1 on the rear side thereof within a site adjacent a rim 1d.

At both ends, the handle 19 has protrusions 19a of elastomer or rubber. As the discussion proceeds, it will be understood that the protrusions 19a are compressed to hold the handle 19 in its stored position as illustrated in FIG. 5A.

Figure 3:
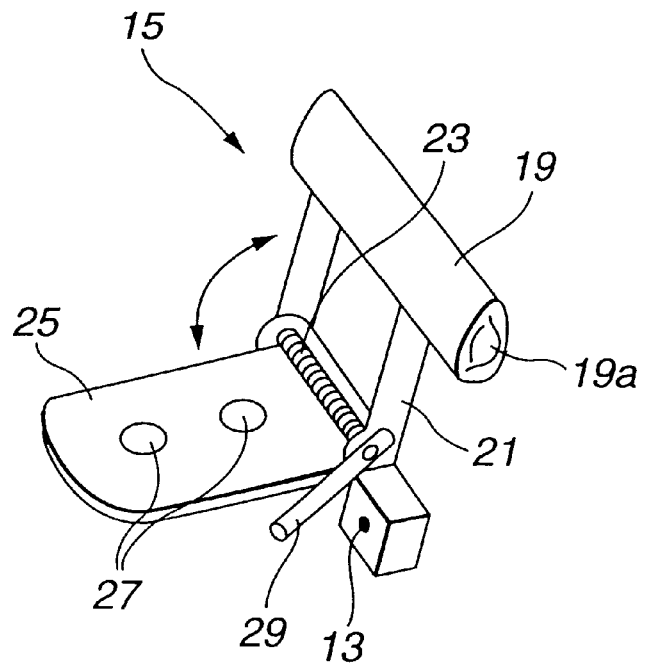
FIG. 3 is a perspective view of an actuator for an interruption switch.

At one ends, a pair of arms 21 support the handle 19. At portions near the opposite ends, the pair of arms 21 is connected to a hinge 23 attached to a mounting plate 25. Accordingly, the handle 19 can rotate about the hinge 23 as shown in FIG. 3. The mounting plate 25 is formed with mounting holes 27. A push rod 29 is fixedly attached to one of the arms 21 and extends from the portion near the hinge 23 for cooperative association with the interruption switch 13. The interruption switch 13 is fixedly mounted on the steering instrumentality 1.

In FIG. 4, the mounting plate 25 is fixedly attached to a core 1b of a spoke 1a of the steering instrumentality 1 by means of a plurality of fasteners 31. Examples of such fasteners are pins and bolts. A steering body cover 1c has a recessed portion 33 for receiving the handle 19a and the arms 21 (FIGS. 4 and 5A), so that, when the actuator 15 is in its stored position, the handle 19 and arms 21 will not project beyond the general surface of the steering body cover 1c.

The preceding description clearly shows that the interruption switch actuator 15 is attached to a rear side of the steering instrumentality 1, which rear side is concealed from the driver's eyes sitting in the normal seating position.

As best seen in FIG. 5A, in the stored position, the handle 19 defines within the recessed portion 33 a clearance or space 33a through which the driver can insert the fingers to lift the handle 19 from the stored position. Wall means defining the recessed portion 33 include two sidewalls 33b, which are spaced apart in a direction along an axis of the hinge 13 to be in opposed relation to the both ends of the handle 19, respectively, in the stored position of the actuator 15. In the stored position of FIG. 5A, the protrusions 19a are compressed between the ends of the handle 19 and the adjacent sidewalls 33b to hold the handle 19 it is stored position. Accordingly, the protrusions 19a serve as a releasable elastic latch of the handle 19. It will also be noted that the arms 21 and hinge 23 cooperate with each other to serve as a guide of the handle 19 to enable displacement of the handle 19 between the stored and operable positions.

As will be readily seen from FIGS. 5A and 5B, the axis of the hinge 23 lies between a steering shaft, not shown, and the rim 1d so that the handle 19 is disposed on the steering shaft side of the hinge 23 in the stored position of FIG. 5A and it is disposed on the rim 1d side of the hinge 23. In the stored position of FIG. 5A, the push rod 29 presses the interruption switch 13, thus deactivating or turning OFF the interruption switch 13. Under this condition, the driver can conducts manual operation of the steering instrumentality 1 to control steering position of the front road wheels. The handle 19 of the actuator 15 is fit into the recessed portion 33 of the steering body cover 1c in the stored position of FIG. 5A, thereby to avoid unintended manual operation of the handle 19.

In order for automatic lane following operation, manual operation to hold the handle 19 at the operational position of FIG. 5B is needed. For a shift from the stored position of FIG. 5A to the operational position of FIG. 5B, the driver insert its finger or fingers into the space 33a to lift the handle 19 from the recessed portion 33 for subsequent rotation around the hinge 23 toward the operational position of FIG. 5B. In the process, the push rod 29 disengages from the interruption switch 13 to activate or turning ON the interruption switch 13. Accordingly, the actuator of the steering system 3 controls steering position of the front wheels in response to the steering signal from the controller 5, thereby to cause the vehicle to automatically follow the lane markings on a road.

In the operational position, the handle 19 is disposed in the proximity of the rim 1d within an area where the driver normally grips the rim 1d. Thus, the driver can keep on holding the handle 19 at the operational position while making a natural grip on the rim 1d without any considerable work load.

For a return shift from the operational position of FIG. 5B to the stored position of FIG. 5A, the hinge 23 facilitates displacement of the handle 19, thus providing a quick and smooth shift.

(Second Preferred Implementation)

Figure 6:
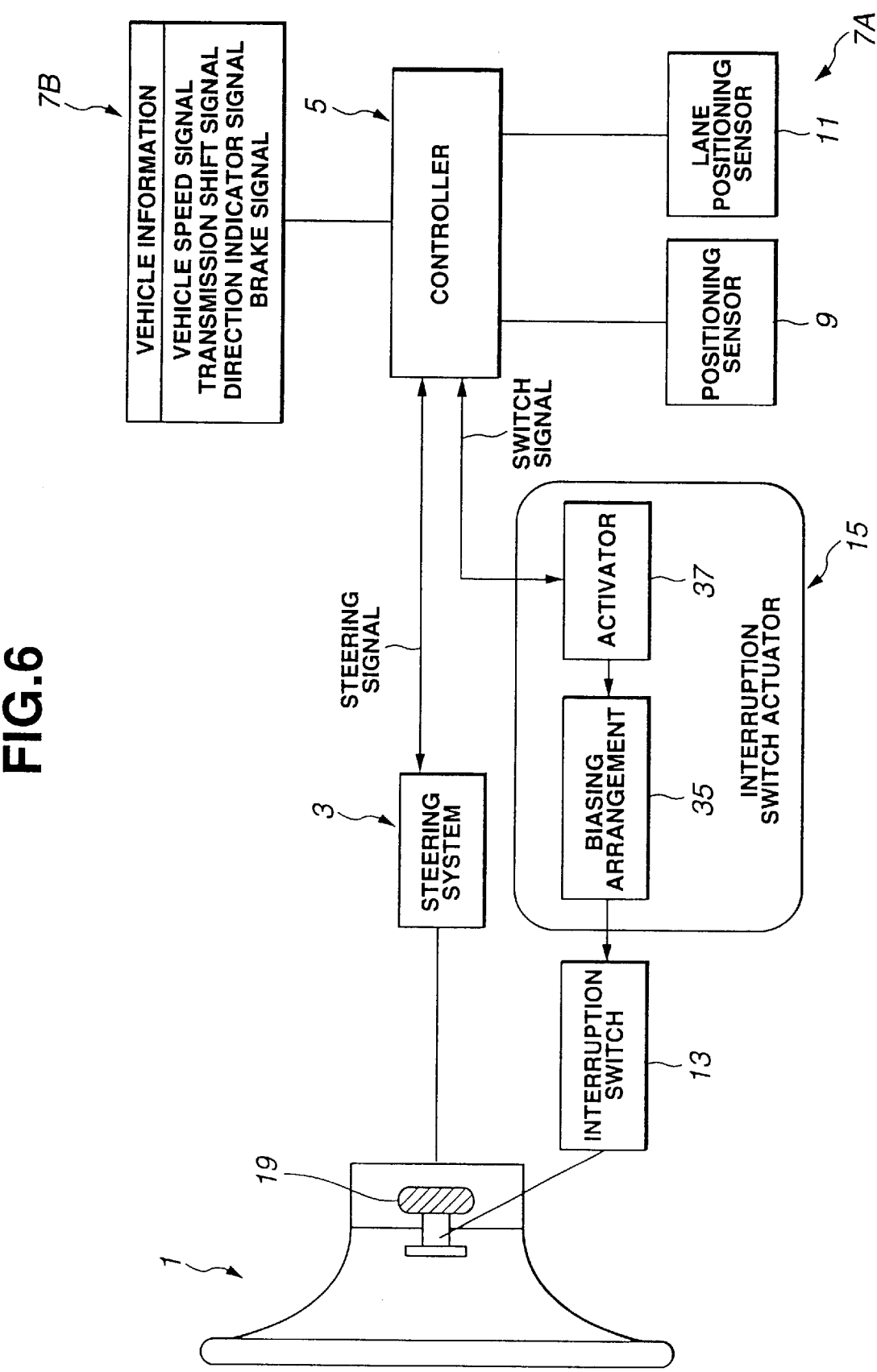
FIG. 6 is a block diagram of a second preferred implementation according to the present invention.

Referring to FIG. 6, description on the second preferred implementation is made. This second preferred implementation is substantially the same as the first preferred implementation except the provision of a modified interruption switch actuator 15 instead of the actuator 15 according to the first preferred implementation.

The modified interruption switch actuator 15 according to the second preferred implementation is substantially the same the actuator 15 according to the first preferred implementation except the provision of an arrangement 35 to bias a handle from one of stored and operational positions to the other when released by an activator 37. The activator 37 may include a lock mechanism that is released when a switch is pressed by a manual operation to release the biasing arrangement 35. The biasing arrangement 35 may include one or any appropriate combination of rubber, spring, magnet, and a fluid spring. If desired, a motor may be used to cause the biasing arrangement 35 to bias the interruption switch actuator 15 in any desired direction between the stored and operational positions.

(Third Preferred Implementation)

Figure 7:
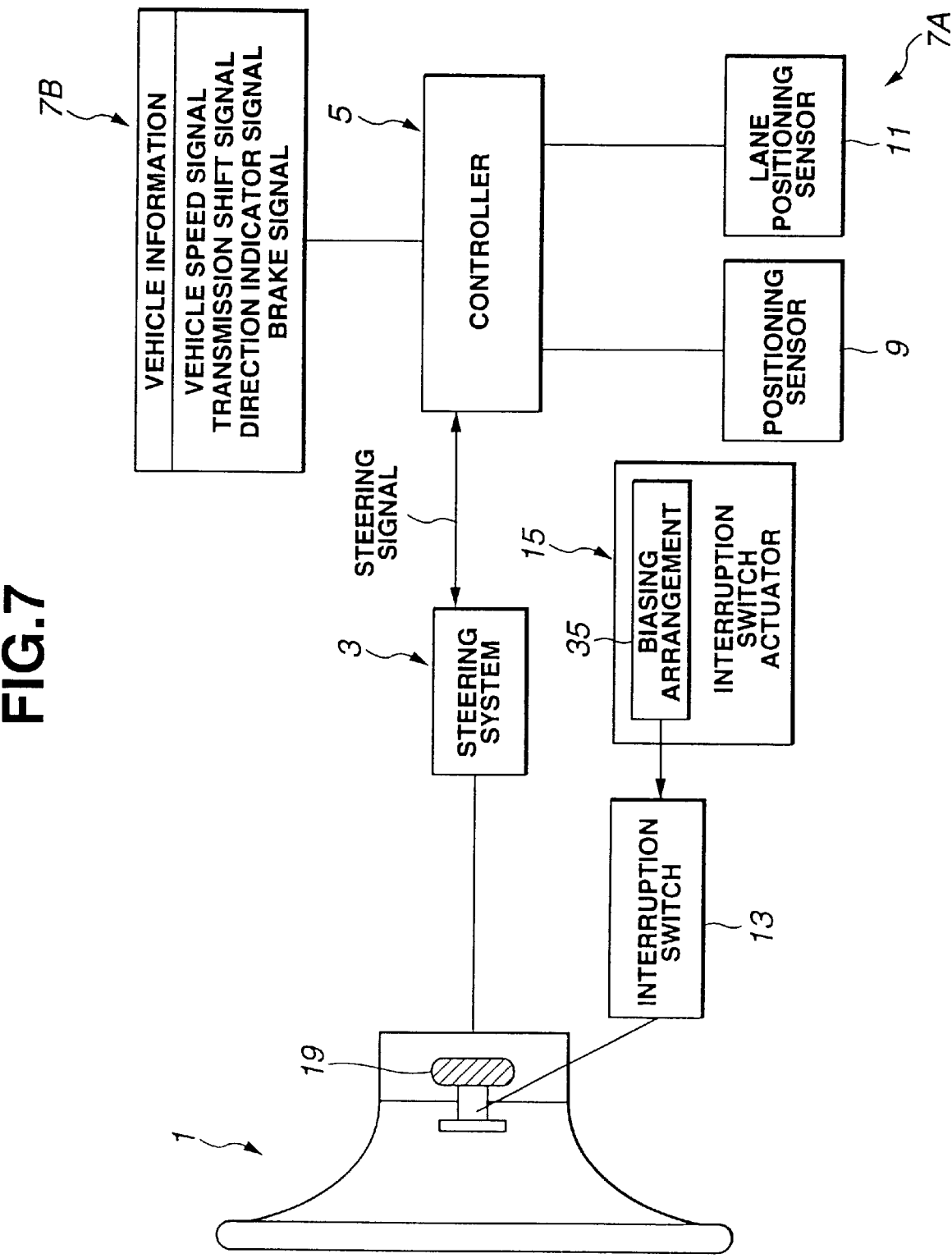
FIG. 7 is a block diagram of a third preferred implementation according to the present invention.

Referring to FIG. 7, description on the third preferred implementation is made. This third preferred implementation is substantially the same as the first preferred implementation except the provision of a modified interruption switch actuator 15 instead of the actuator 15 according to the first preferred implementation.

The modified interruption switch actuator 15 according to the third preferred implementation is substantially the same the actuator 15 according to the first preferred implementation except the provision of an arrangement 35 to always and resiliently bias a handle 19 toward the stored position from the operational position.

Since the handle 19 is resiliently biased toward its stored position, only keeping fingers off the handle 19 will cause its quick displacement to the stored position.

(Fourth Preferred Implementation)

Figure 8:
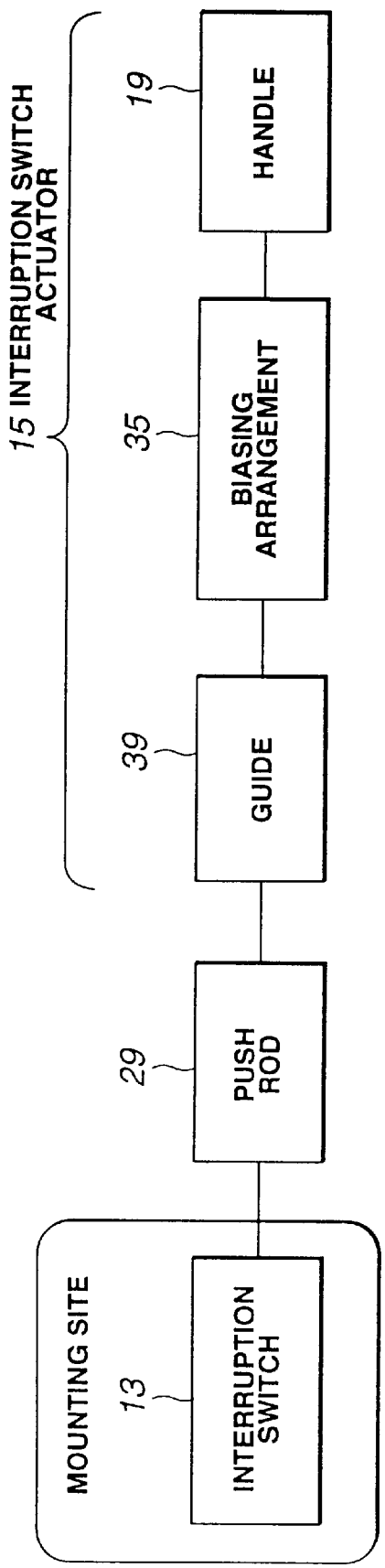
FIG. 8 is a block diagram of a fourth preferred implementation according to the present invention.
Figure 9:
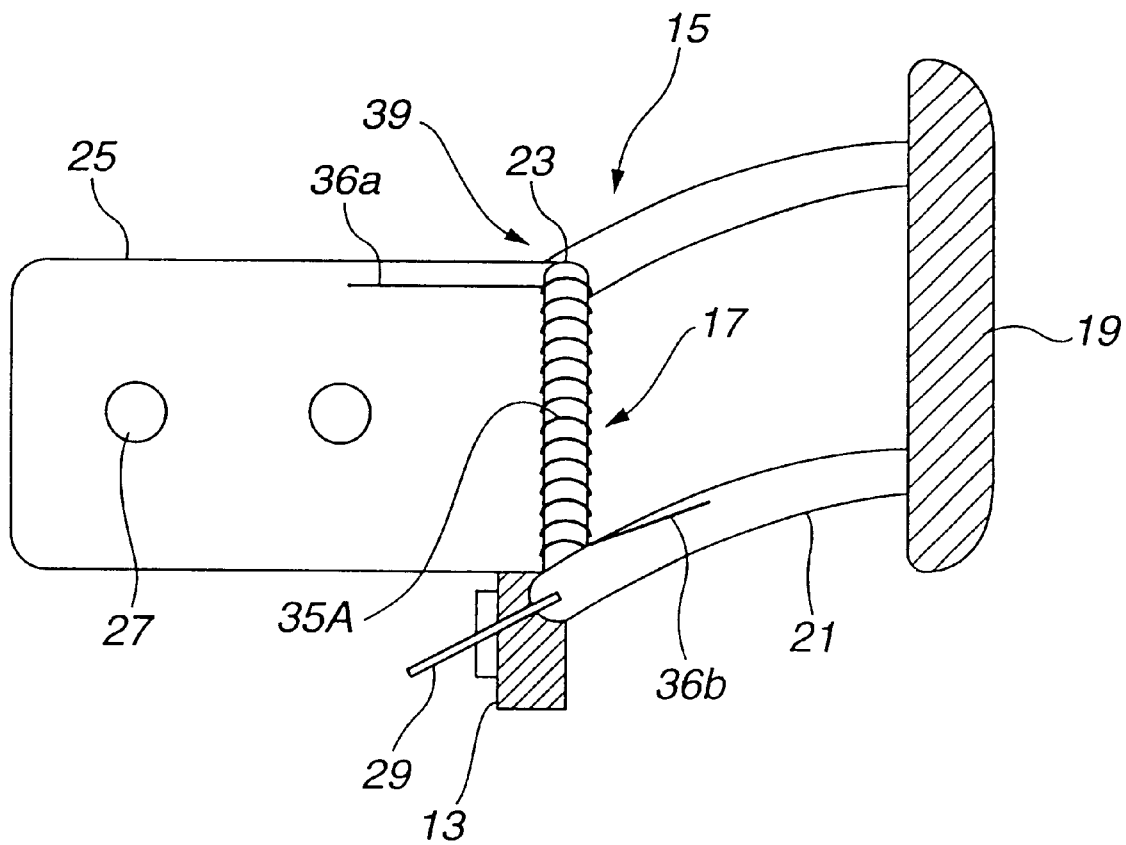
FIG. 9 is a plan view of an actuator for an interruption switch according to the fourth preferred implementation.

Referring to FIGS. 8 and 9, description on the fourth preferred implementation is made. According to this fourth preferred implementation, an interruption switch actuator 15 includes an arrangement 35 to always and resiliently bias a handle 19 toward its stored position from its operational position in addition to a guide 39 for smooth displacement of the handle.

As best seen in FIG. 9, arms 21 and a hinge 23 constitute the guide 39. A torque spring 35A constitutes the biasing arrangement 35. The torque spring 35A encircles the hinge 23 and has one arm 36a lying against a mounting plate 25 and an opposite arm 36b bearing against the arm 21 to apply torque to the handle 19 in a direction toward the stored position. It is to be noted that the interruption switch actuator 15 shown in FIG. 9 is substantially the same as that shown in FIGS. 3 to 5B except the provision of the torque spring 35A.

Since the handle 19 is resiliently biased toward its stored position at all times, only keeping fingers off the handle 19 will cause its quick displacement to the stored position.

Figure 10:
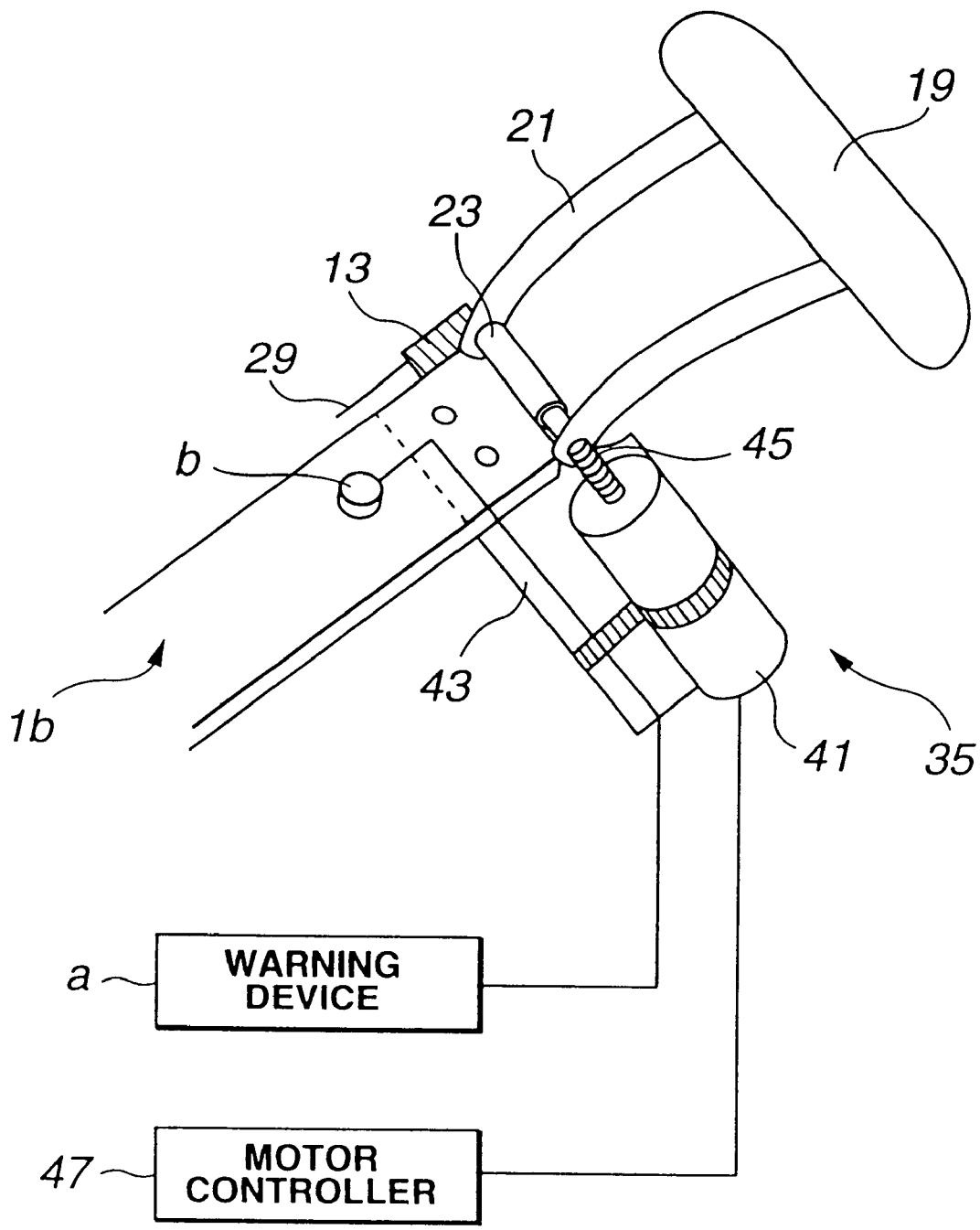
FIG. 10 is a perspective view of another example of an actuator for an interruption switch.
Figure 11:
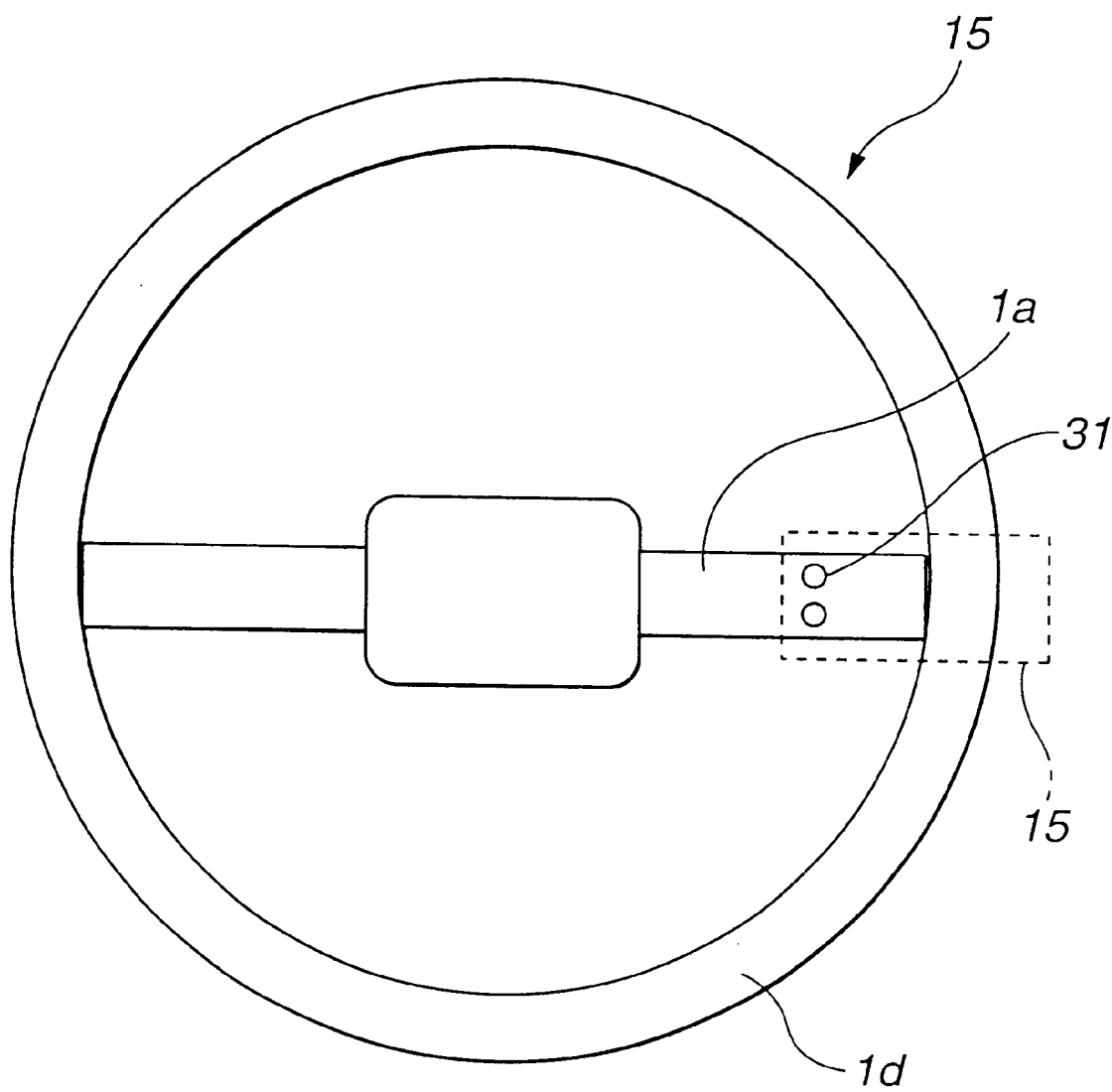
FIG. 11 is a plan view of a steering instrumentality with a mounting site for an actuator for an interruption switch, illustrating a fifth preferred implementation according to the present invention.

FIG. 10 illustrates a modification of a biasing arangement 35. The modified biasing arangement incorporates a motor mechanism. A motor 41 is fixedly attached to a motor mounting bracket 43. The bracket 43 is fixedly secured to a spoke core 1b by appropriate mechanical fasteners, such as pins, bolts and nuts. The motor output shaft 45 is coupled to a hinge 23.

Activation of the motor 41 causes the hinge 23 to rotate to move a handle 19 between its stored position and its operational position. A motor controller 47 serves as an activator to control activation of the motor 41. Direction of movement of the handle 19 controlled by a switch that may be positioned on the steering shaft side of the hinge 23.

Further, a vibrator b is mounted on the spoke core 1b. A warning device a controls vibration of the vibrator b. A vibrator may be disposed within the handle 19.

(Fifth Preferred Implementation)

Referring to FIGS. 11 to 15B, description on the fifth preferred implementation is made. According to this fifth preferred implementation, an interruption switch actuator 15 of the slide type is proposed.

Figure 12A:
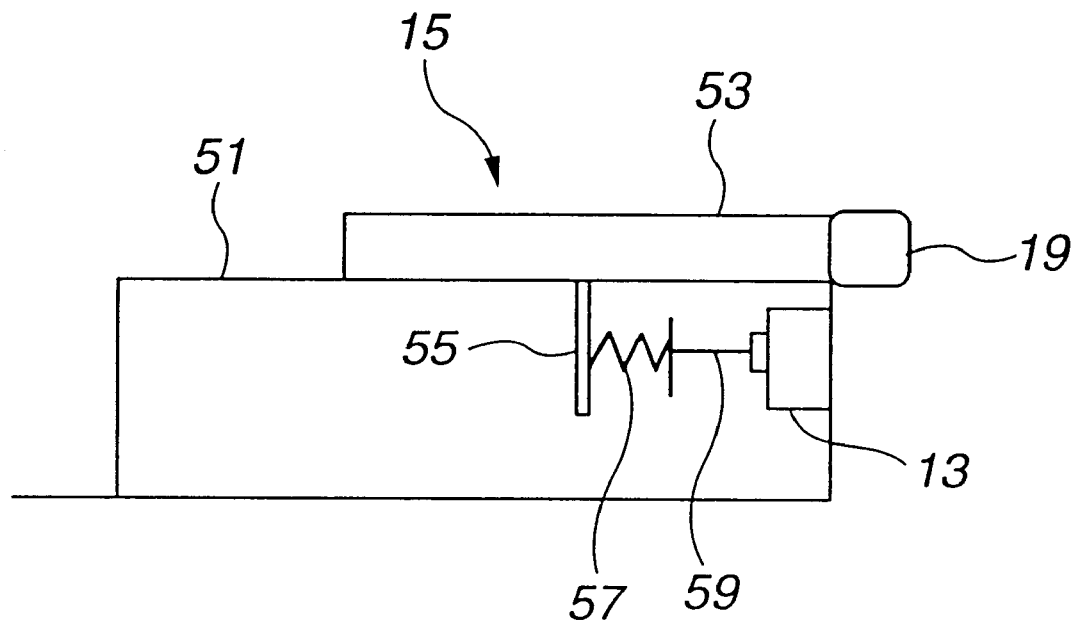
FIG. 12A is a section of a still another example of an actuator for an interruption switch.
Figure 12B:
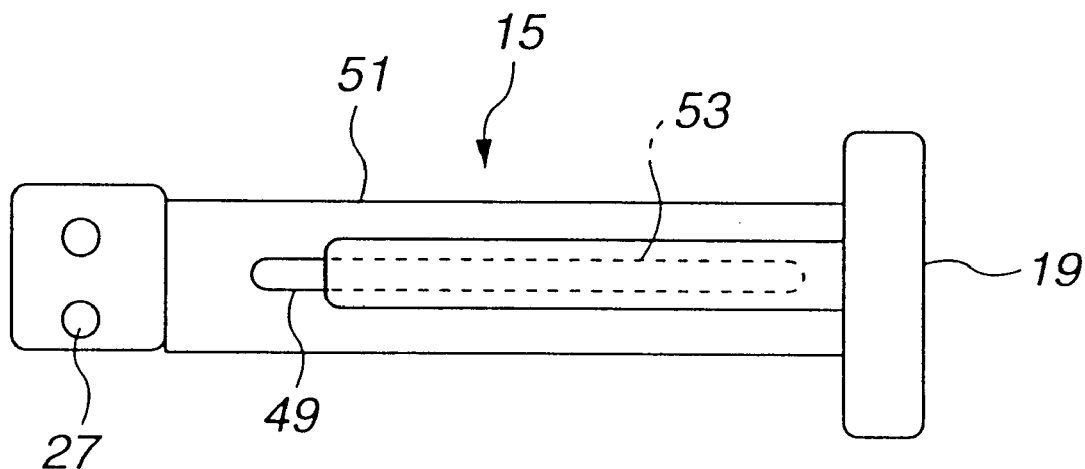
FIG. 12B is a plan view of the actuator shown in FIG. 12A.
Figure 13:
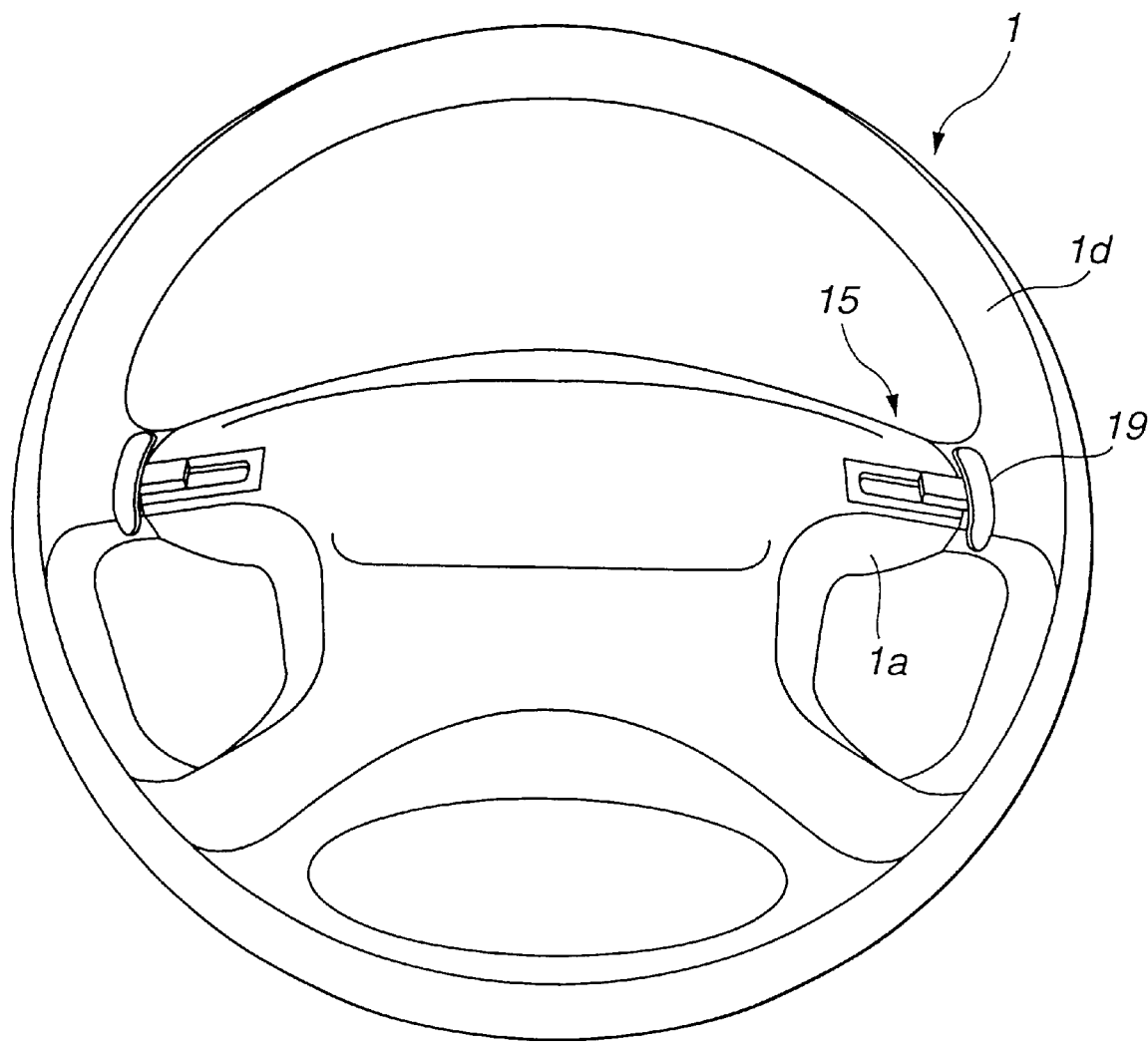
FIG. 13 is a plan view of a steering instrumentality equipped with an actuator for an interruption switch that is located on each of two laterally spaced sites.

As best seen in FIG. 12B, the actuator 15 includes a base 51 formed with a longitudinal groove 49. The base 51 supports an arm 53 for sliding movement. At one end, the arm 53 has a handle 19. A guide rod 55, which extends from the arm 53 downwardly viewing in FIG. 12A, is guided by the groove 49. The groove 49, which serves as a guide, is formed inwardly into a spoke portion 1a as seen in FIG. 13. A spring 57 serves as a biasing arangement. Via the spring 57, the arm 53 has a push rod 59. The spring 57 is operatively disposed between the guide rod 55 and the push rod 59. The push rod 59 is opposed to an interruption switch 13. The actuator 15 of this slide type is fixedly attached to a core 1b of the spoke 1a of the steering instrumentality 1 by means of appropriate fasteners, such as pins or bolts and nuts.

Figure 14A:
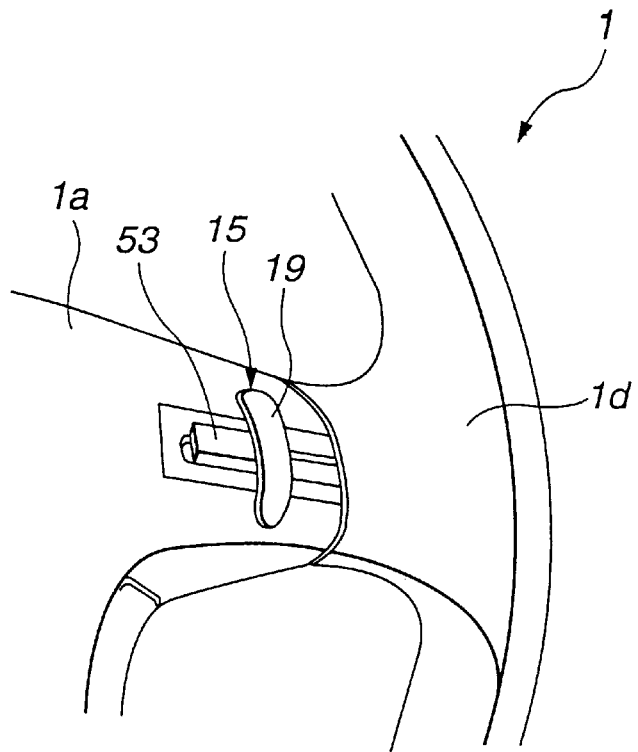
FIG. 14A illustrates the actuator of FIG. 13 in its stored position.
Figure 14B:
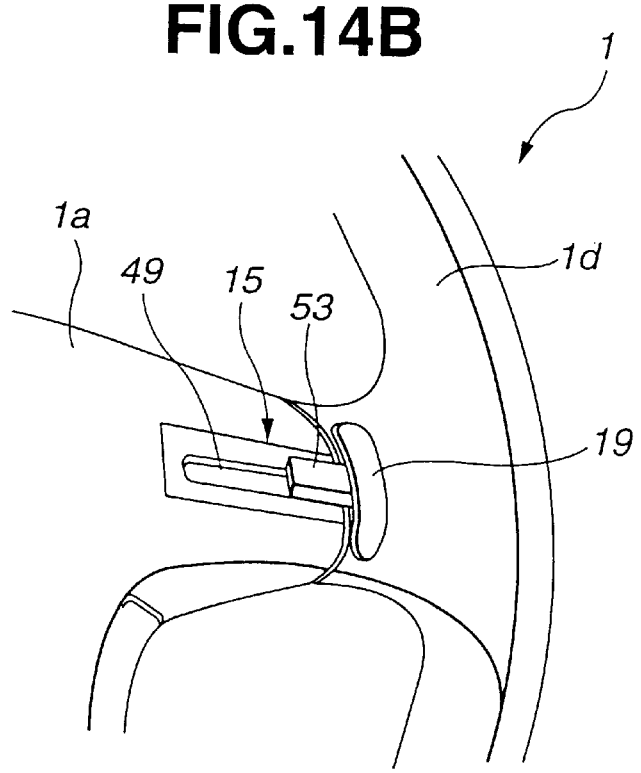
FIG. 14B illustrates the actuator of FIG. 13 in its operational position.
Figure 15A:
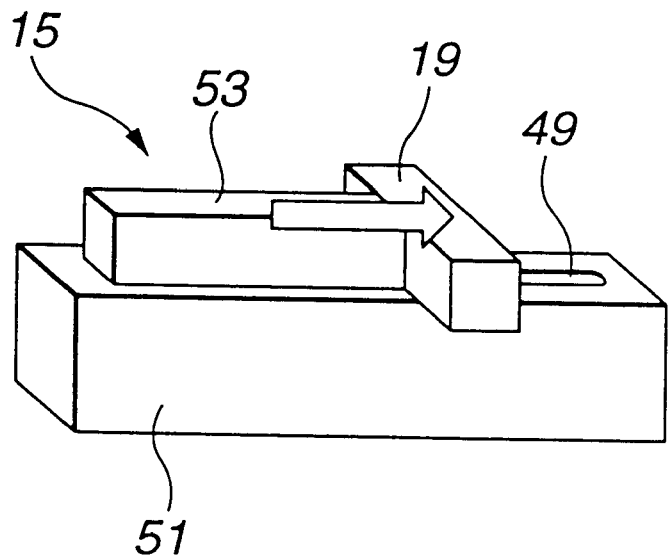
FIG. 15A illustrates the actuator of FIG. 13 in its stored position.
Figure 15B:
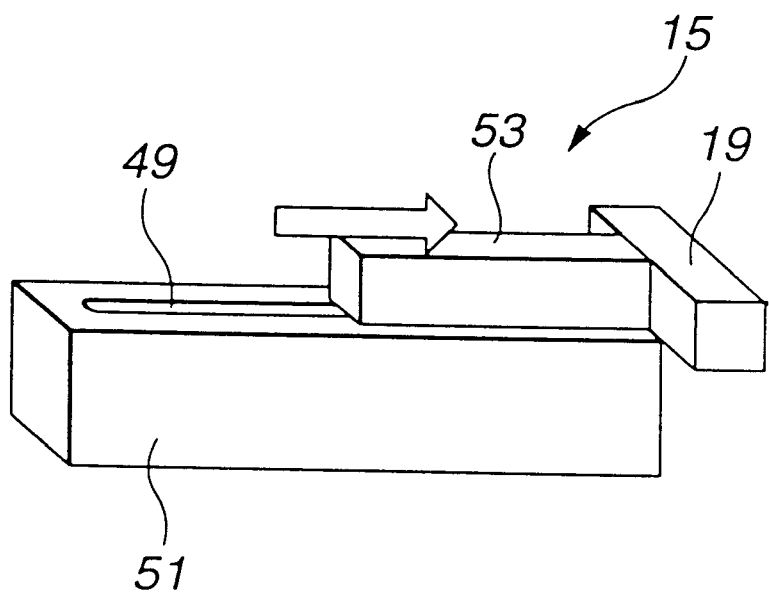
FIG. 15B illustrates the actuator of FIG. 13 in its operational position.

Referring to FIGS. 14A and 14B, the vehicle driver manually pulls the handle 19 toward a rim 1d of the steering instrumentality 1. In this process, the guide rod 55 is guided by the groove 49 to push via the spring 57 the push rod 59, thus activating or turning ON the interruption switch 13. In this manner, activation of the interruption switch 13 enables a lane following system. The driver keeps on gripping the handle 19 against the bias of the spring 57 in the operable position of FIG. 14B. Upon keeping the fingers off the handle 19, the spring 57 moves the handle 19 to the stored position of FIG. 14A immediately.

As best seen in FIG. 13, the actuators 15 are attached to the front side of the steering instrumentality 1, which front side is exposed to the driver's eyes. This provision of the actuators is advantageous in facilitating driver's recognition of operation of the interruption switch 13.

Figure 16:
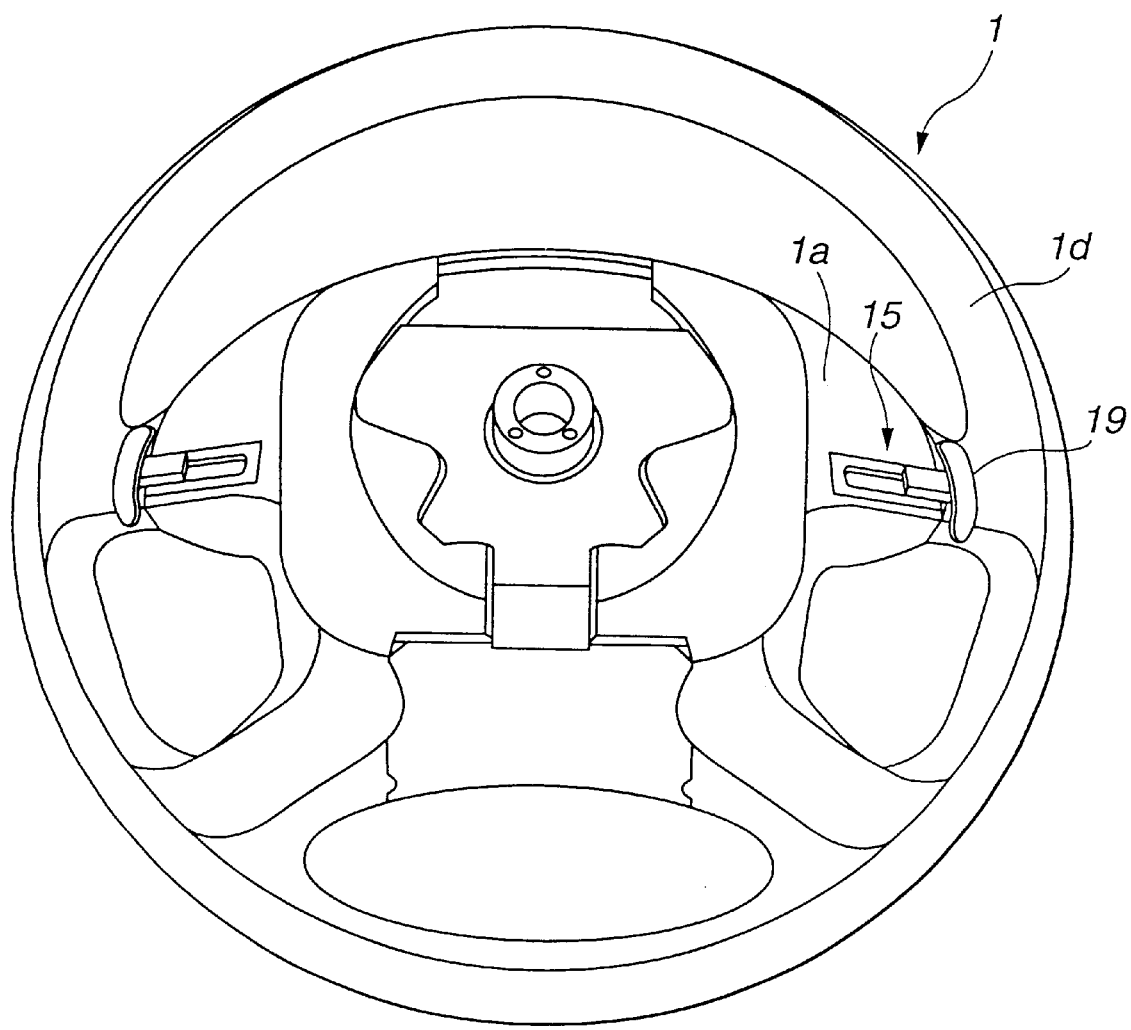
FIG. 16 is a plan view of a steering instrumentality equipped with an actuator for an interruption switch that is located on each of two laterally spaced sites, illustrating a modification of the fifth preferred implementation according to the present invention.
Figure 17A:
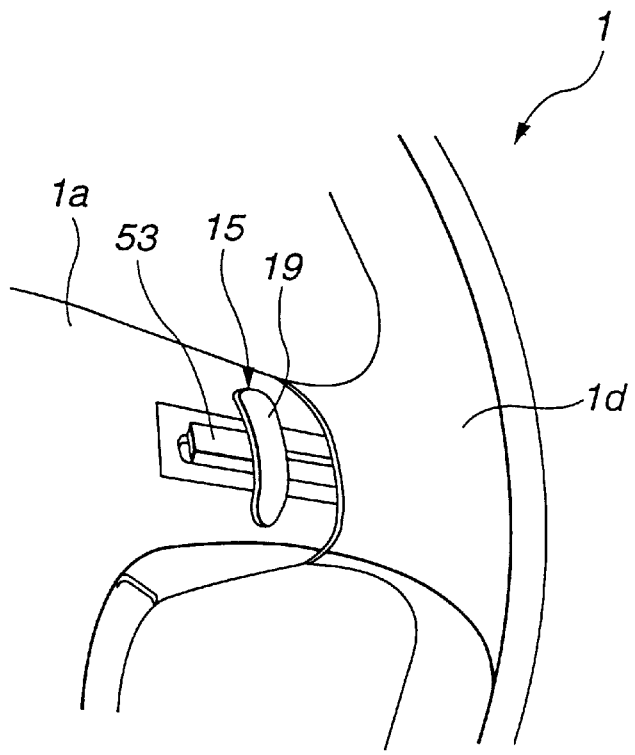
FIG. 17A illustrates the actuator of FIG. 16 in its stored position.
Figure 17B:
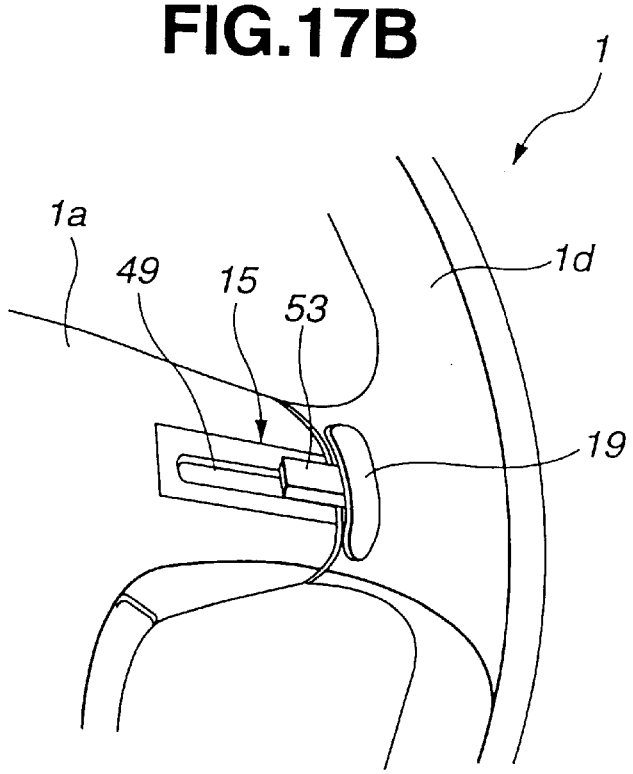
FIG. 17B illustrates the actuator of FIG. 16 in its operational position.

FIGS. 16, 17A, and 17B illustrate a modification of the fifth preferred implementation. In this modification, actuators 15 of the slide type are mounted on the rear of the steering instrumentality 1. The actuators of this modification are substantially the same as those shown in FIGS. 12A to 15B. The provision of the actuators on the rear side of the steering instrumentality 1 will not restrict the degree of freedom in designing the exposed front side of the steering instrumentality 1.

(Sixth Preferred Implementation)

Figure 18:
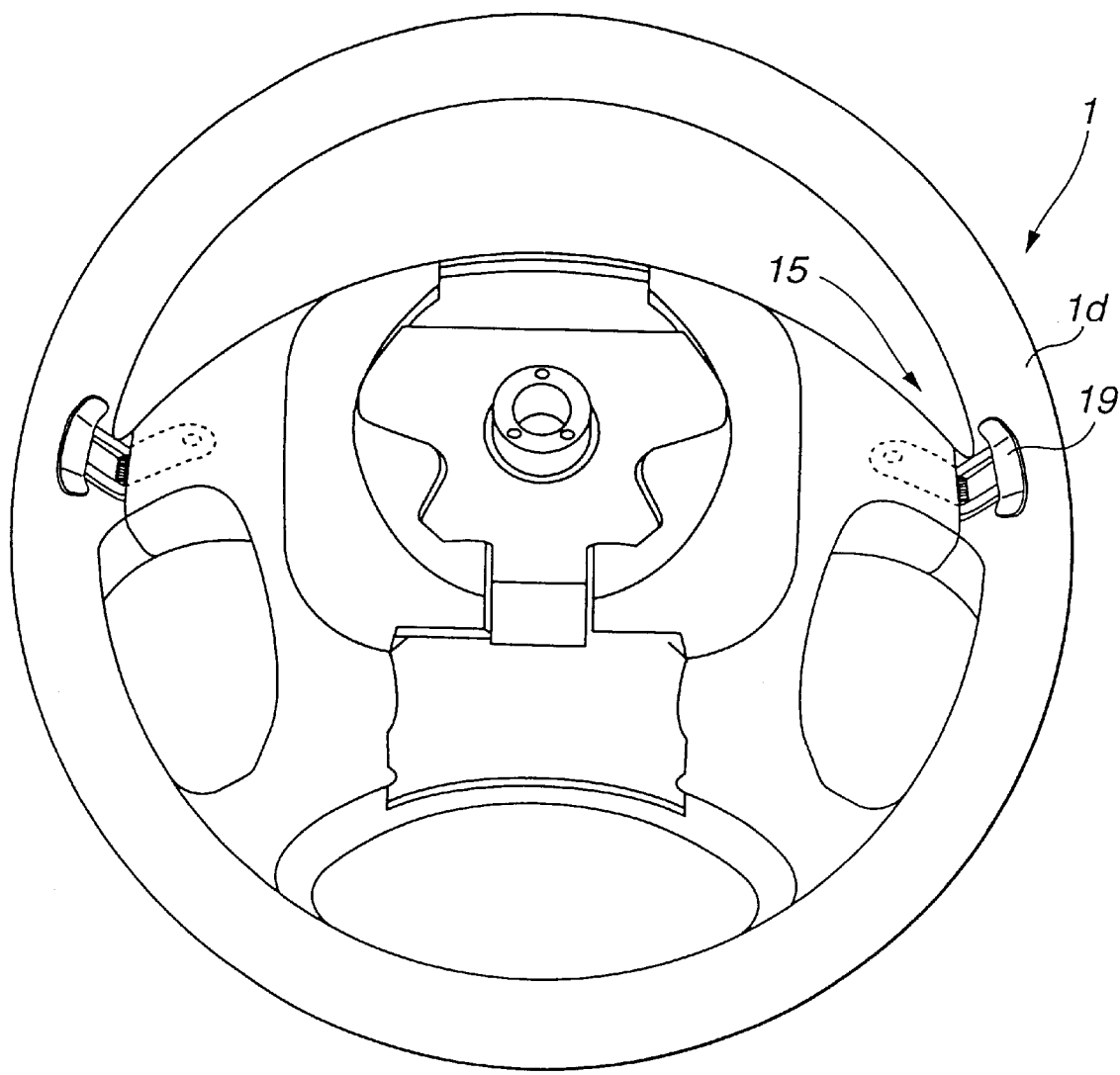
FIG. 18 is a plan view of a steering instrumentality equipped with an actuator for an interruption switch that is located on each of two laterally spaced sites, illustrating a sixth preferred implementation according to the present invention.
Figure 19A:
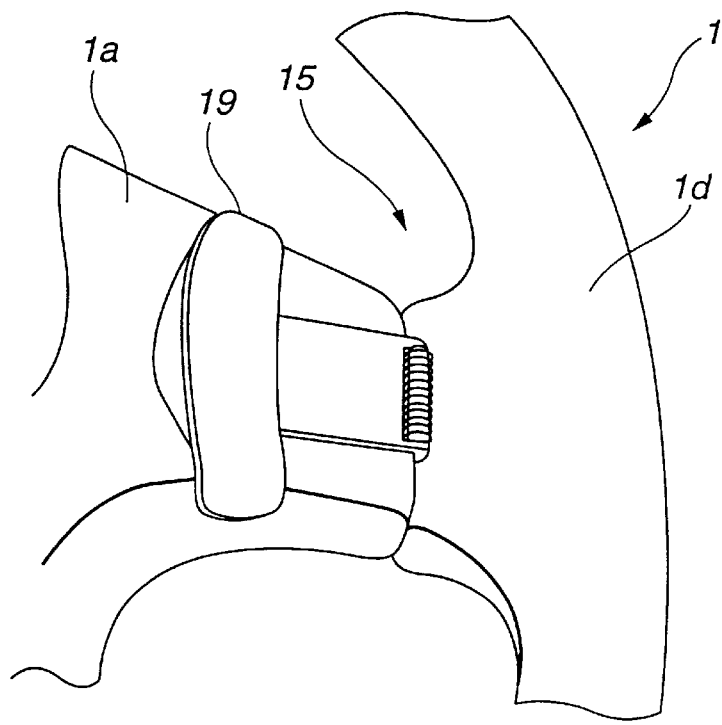
FIG. 19A illustrates the actuator of FIG. 18 in its stored position.
Figure 19B:
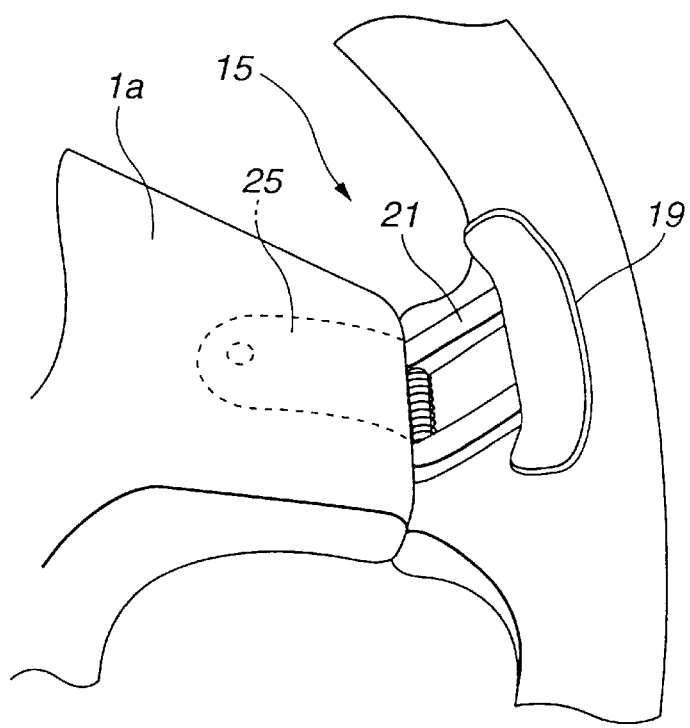
FIG. 19B illustrates the actuator of FIG. 18 in its operational position.
Figure 20:
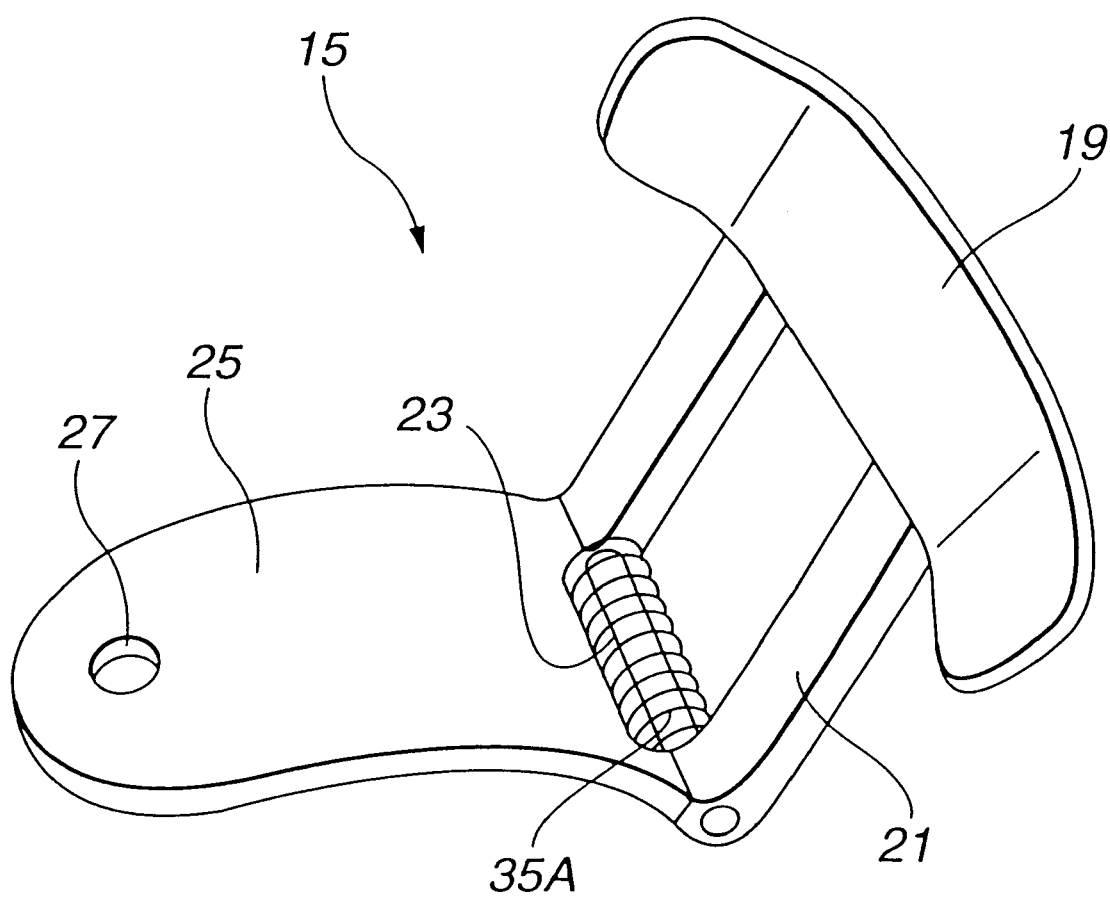
FIG. 20 is a perspective view of the actuator of FIG. 18.

Referring to FIGS. 18 to 20, description on the sixth preferred implementation is made. The sixth preferred implementation employs an interruption switch actuator 15 that is substantially the same as the actuator shown in FIG. 9. The actuators 15 are mounted on a steering instrumentality 1 in the same manner as described in relation to the first preferred implementation. According to the sixth preferred implementation, a handle 19 is in the form of a lever-like member having a surface with a curvature that is generally the same as the curvature of the rim 1d of the steering instrumentality 1. FIG. 19A illustrates the stored position, while FIG. 19B illustrates the operational position.

The surface curvature of the handle 19 according to this sixth preferred implementation provides a fit feeling to hands of the vehicle driver. Thus, if a vibrator is disposed within the handle 19, warning information is transmitted to the driver in good manner.

From the preceding description, it is now understand that an interruption switch 13 and an interruption switch actuator 15 with a handle 19 constitute a human interface operatively coupled to a controller 5. When the handle 19 is in a rest or stored position, the interruption switch actuator 15 deactivates the interruption switch 13, thereby to deactivate an actuator of a steering system 3 for controlling the steering position of the front road wheels. When the handle 19 is held in an operable position by manual operation of a driver, the interruption switch actuator 15 activates the interruption switch 13, thereby to activate the steering system actuator. Under this condition, the steering system actuator controls the steering position of the front road wheels to follow the lane marking on a road.

While the present invention has been particularly described in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-131615, filed May 12, 1999 is hereby incorporated by reference in its entirety.

What is claimed is:

1. A lane following system for a vehicle, comprising:
   a steering instrumentality;
   a steering system including a steering mechanism for controlling the steering position of front road wheels of the vehicle in response to manual operation of said steering instrumentality,
   said steering system including an actuator for controlling the steering position of the front road wheels in response to a steering signal;
   a controller operative to generate the steering signal;
   an interruption switch operatively coupled to said controller to deactivate said actuator when said interruption switch has a first position thereof and to activate said actuator when said interruption switch has a second position; and
   an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said rest position is a stored position into said steering instrumentality,
   wherein said interruption switch actuator includes a handle and an arrangement to bias said handle for displacement in at least one direction.

2. The lane following system as claimed in claim 1, wherein said handle has a releasable elastic latch in the form of protrusions, which are adapted to be compressed to hold said handle in the stored position.

3. A lane following system for a vehicle, comprising:
   a steering instrumentality;
   a steering system including a steering mechanism for controlling the steering position of front road wheels of the vehicle in response to manual operation of said steering instrumentality,
   said steering system including an actuator for controlling the steering position of the front road wheels in response to a steering signal;
   a controller operative to generate the steering signal;
   an interruption switch operatively coupled to said controller to deactivate said actuator when said interruption switch has a first position thereof and to activate said actuator when said interruption switch has a second position; and
   an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said interruption switch actuator is attached to a rear side of said steering instrumentality, which rear side is concealed from the driver's eyes,
   wherein said interruption switch actuator includes a hinge, a handle, and a pair of arms interconnecting said hinge and said handle.

4. A lane following system for a vehicle, comprising:
   a steering instrumentality;
   a steering system including a steering mechanism for controlling the steering position of front road wheels of the vehicle in response to manual operation of said steering instrumentality,
   said steering system including an actuator for controlling the steering position of the front road wheels in response to a steering signal;
   a controller operative to generate the steering signal;
   an interruption switch operatively coupled to said controller to deactivate said actuator when said interruption switch has a first position thereof and to activate said actuator when said interruption switch has a second position; and
   an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position,
   wherein said interruption switch actuator includes an arm having a handle and groove means for guiding said arm for sliding displacement between the rest position and the operational position.

5. A lane following system for a vehicle, comprising:
   a steering instrumentality;
   a steering system including a steering mechanism for controlling the steering position of front road wheels of the vehicle in response to manual operation of said steering instrumentality,
   said steering system including an actuator for controlling the steering position of the front road wheels in response to a steering signal;
   a controller operative to generate the steering signal;
   an interruption switch operatively coupled to said controller to deactivate said actuator when said interruption switch has a first position thereof and to activate said actuator when said interruption switch has a second position; and
   an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said interruption switch actuator is attached to a rear side of said steering instrumentality, which rear side is concealed from the driver's eyes,
wherein said steering instrumentality includes a rim and a spoke within said rim, and wherein said interruption switch actuator includes a mounting plate attached to said spoke, a hinge on said mounting plate, a handle, and a pair of arms interconnecting said hinge and said handle.

6. The lane following system as claimed in claim 5, wherein said handle is displaceable in a rotational direction about said hinge toward said rim.

7. A lane following system for a vehicle, comprising:
a steering instrumentality;
a steering system including a steering mechanism for controlling the steering position of front road wheels of the vehicle in response to manual operation of said steering instrumentality,
said steering system including an actuator for controlling the steering position of the front road wheels in response to a steering signal;
a controller operative to generate the steering signal;
an interruption switch operatively coupled to said controller to deactivate said actuator when said interruption switch has a first position thereof and to activate said actuator when said interruption switch has a second position; and
an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said interruption switch actuator is attached to a front side of said steering instrumentality, which front side is exposed to the driver's eyes,
wherein said steering instrumentality includes a rim and a spoke within said rim, and wherein said interruption switch actuator includes an arm with a handle and a guide rod extending from said arm, and wherein said spoke is formed with a groove receiving said guide rod.

8. The lane following system as claimed in claim 7, wherein said handle is displaceable in a linear direction along said groove toward said rim.

9. A lane following system for a vehicle, comprising:
a steering instrumentality;
a steering system including a steering mechanism for controlling the steering position of front road wheels of the vehicle in response to manual operation of said steering instrumentality,
said steering system including an actuator for controlling the steering position of the front road wheels in response to a steering signal;
a controller operative to generate the steering signal;
an interruption switch operatively coupled to said controller to deactivate said actuator when said interruption switch has a first position thereof and to activate said actuator when said interruption switch has a second position; and
an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said rest position is a stored position into said steering instrumentality, and said stored position is spaced remote from a rim of said steering instrumentality, wherein said operational position is in the proximity of said rim, wherein said interruption switch actuator includes a handle displaceable into a stored position when said interruption switch actuator is in the stored position thereof and an operative position when said interruption switch actuator is in the operative position thereof, wherein said interruption switch actuator includes a guide supporting the displacement of said handle,
wherein said guide is in the form of a groove formed in a spoke of said steering instrumentality within said rim.

10. A lane following system for a vehicle, comprising;
a steering instrumentality;
a steering system including a steering mechanism for controlling the steering position of front road wheels of the vehicle in response to manual operation of said steering instrumentality,
said steering system including an actuator for controlling the steering position of the front road wheels in response to a steering signal;
a controller operative to generate the steering signal;
an interruption switch operatively coupled to said controller to deactivate said actuator when said interruption switch has a first position thereof and to activate said actuator when said interruption switch has a second position; and
an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said rest position is a stored position into said steering instrumentality, and said stored position is spaced remote from a rim of said steering instrumentality, wherein said operational position is in the proximity of said rim, wherein said interruption switch actuator includes a handle displaceable into a stored position when said interruption switch actuator is in the stored position thereof and an operative position when said interruption switch actuator is in the operative position thereof, wherein said interruption switch actuator includes a guide supporting the displacement of said handle, wherein said guide includes a hinge on said steering instrumentality and arm means interconnecting said handle and said hinge.

11. A lane following system for a vehicle, comprising:

a steering instrumentality;

a steering system including a steering mechanism for controlling the steering position of front road wheels of the vehicle in response to manual operation of said steering instrumentality, said steering system including an actuator for controlling the steering position of the front road wheels in response to a steering signal;

a controller operative to generate the steering signal;

an interruption switch operatively coupled to said controller to deactivate said actuator when said interruption switch has a first position thereof and to activate said actuator when said interruption switch has a second position; and an interruption switch actuator mounted on said steering instrumentality and operatively associated with said interruption switch, said interruption switch actuator having a rest position in which said interruption switch actuator deactivates said interruption switch to keep said interruption switch at said first position, said interruption switch actuator having an operational position in which said interruption switch actuator activates said interruption switch to keep said interruption switch at said second position, said interruption switch actuator being displaceable between said rest position and said operational position, wherein said rest position is a stored position into said steering instrumentality, and said stored position is spaced remote from a rim of said steering instrumentality, wherein said operational position is in the proximity of said rim, wherein said interruption switch actuator includes a handle displaceable into a stored position when said interruption switch actuator is in the stored position thereof and an operative position when said interruption switch actuator is in the operative position thereof, wherein said handle is disposed on the rear side of said rim when said interruption switch actuator is in the operative position thereof.

12. The lane following system as claimed in claim 11, wherein said handle includes a surface having a curvature generally the same as that of said rim.

* * * * *